United States Patent Office

Re. 25,993
Reissued Mar. 22, 1966

25,993

PROCESS OF COATING SUBSTRATE WITH COMPOSITION COMPRISING CARBOXYL-CONTAINING COPOLYMER AND AMINE-ALDEHYDE CONDENSATE

Darrell D. Hicks, Louisville, Ky., assignor, by mesne assignments, to Devoe & Raynolds Company, Inc., New York, N.Y., a corporation of Delaware No Drawing. Original No. 2,931,742, dated Apr. 5, 1960, Ser. No. 564,358, Feb. 9, 1956. Application for reissue Nov. 10, 1964, Ser. No. 425,652
1 Claim. (Cl. 117—161)

Matter enclosed in heavy brackets [ ] appears in the original patent but forms no part of this reissue specification; matter printed in italics indicates the additions made by reissue.

This invention pertains to new resinous compositions and to methods for their preparation. The invention relates to polymeric materials and film-forming compositions particularly useful in the production of protective coatings and other final reaction products of outstanding properties. In one of its aspects this invention relates to new products and compositions resulting from the reaction of various carboxy-containing vinyl copolymers with condensates of aldehydes and ammonia derivatives (amines and amides) in regulated proportions to give valuable compositions which are useful in the manufacture of varnishes, adhesives, films, fibers and the like.

It has been found that carboxyl-containing vinyl copolymers, as prepared from a polymerizable monocarboxylic acid and a vinyl compound, are unsuitable for the formation of protective coatings or the impregnation of porous materials. These copolymers have no acetone resistance, indicating that there is a low degree of cure or cross-linking, and they also have poor mar resistance. In accordance with this invention, however, if caroxyl-containing vinyl copolymers are reacted with condensates of aldehydes and ammonia derivatives, reaction products are formed which have especially good acetone resistance as well as excellent mar resistance. Moreover, films are obtained having extremely high gloss characteristics. Additionally, high acid value resin blends are obtainable by the practice of this invention which are stable under storage conditions. This is in contrast to the poor package stability of blends of alkyd-urea aldehyde condensates having comparable acid values.

The carboxyl-containing copolymers used for reacting with aldehyde condensates according to the present invention are formed by reacting the vinyl monomer with acrylic acid, and methacrylic acid.

Copolymerized with the alpha-beta unsaturated acids are monomers copolymerizable therewith containing a single vinyl or vinylidine group. Particularly important are vinyl aromatic compounds, for instance, styrene, vinyl toluene, alpha-methyl styrene, the halostyrenes, etc. having a single vinyl group and free of other substituents capable of reacting with an unsaturated acid, i.e., a monofunctional vinyl aromatic compound. Also valuable are saturated alcohol esters of acrylic, and methacrylic acids. Examples of monofunctional vinyl aromatic monomers are iso propenyl toluene, the various dialkyl styrenes, ortho-, meta-, and para-chloro styrenes, bromo styrenes, fluoro styrenes, cyano styrenes, vinyl naphthalene, the various alpha-substituted styrenes, e.g., alpha-methyl styrenes, alpha-methyl para-methyl styrenes, as well as variout di-, tri-. and tetra-chloro, bromo, and fluoro styrenes. Acrylic, and methacrylic esters of saturated alcohols include the methyl, ethyl, propyl, isopropyl, n-butyl, isobutyl, (sec)butyl, (tert)butyl, amyl, hexyl, heptyl, octyl, decyl, dodecyl, etc. esters of acrylic and methacrylic acids. Thus preferred vinyl monomers include alpha-beta unsaturated monocarboxylic acid esters of saturated monohydric alcohols, the acids having not more than 4 carbon atoms and the alcohols having not more than 20 carbon atoms and monofunctional vinyl aromatic compounds.

Mixtures of the vinyl monomers can be copolymerized with the alpha-beta unsaturated acids to form the carboxyl-containing vinyl copolymer. A particularly desirable mixture is a combination of an acrylic or methacrylic ester with styrene or vinyl toluene.

Copolymers of alpha-beta unsaturated acids and vinylidene monomers, such as those disclosed herein, are generally prepared by heating the monomers in a solvent in the presence of a catalyst, e.g., a peroxide and more particularly an organic peroxide catalyst in accordance with well known methods. Suitable solvents are xylene and other aromatic hydrocarbon solvents, esters, ketones and mixtures of hydrocarbons with esters and ketones.

Catalysts include such peroxides as cumene hydroperoxide, benzoyl peroxide, acetyl peroxide, phthalic peroxide and others. Polymerization temperatures vary from 60° C. to 135° C., depending upon the method used.

It is known that various amines and amides will condense with aldehydes to form aldehyde-amine and aldehyde-amide condensates. Thus, urea, thiourea, and various substituted ureas and urea derivatives will react with aldehydes such as formaldehyde to form condensates, e.g., methylol ureas, etc. Similarly, it is well known that melamines, for instance, melamine itself and substituted melamines such as benzoguanamine, will reach with aldehydes, particularly formaldehyde, to form melamine-aldehyde condensates. Various other amines and amides can similarly be reacted with formaldehyde, etc. to form condensates which are amine aldehyde or amide aldehyde resins or condensates. Thus, other amino-triazines and amino-diaxines will react with aldehydes to form condensates. Many of the present day commercial resins prepared by the reaction of urea or melamine or both with aldehydes are prepared in the presence of alcoholic or other solvents which actually take part in the reaction and become an integral part of the resulting resin composition. These known aldehyde condensates with ammonia derivatives are used for reacting with carboxyl-containing vinyl copolymers according to this invention.

In general, fusible urea aldehyde condensates of different degrees of condensation can be used with the carboxyl-containing vinyl copolymer to form the new compositions and reaction products. Thus, urea aldehyde condensates can be made by various processes known in the art for the manufacture of urea formaldehyde resins Similarly the melamine aldehyde condensates of different states of condensation, so long as they are fusible, can be used with the copolymers to form the new compositions. In any case, preferred aldehyde condensates are alkylated condensates of aldehydes with organic ammonia derivatives, which, as indicated, result when the condensates are prepared in the presence of alcohols and the like; these solvents actually become part of the resulting product. This is illustrated by the products prepared in the presence of butyl and other alcohols in which case the butyl alcohol to some extent condenses with the alkylol groups of the aldehyde condensate to form butylated and similar urea or melamine aldehyde compositions.

Since urea aldehyde condensates or melamine aldehyde condensates can be at different stages of conversion when used with the carboxyl-containing vinyl copolymer, compositions of somewhat different characteristics can be obtained with products of different stages of conversion. Similarly different aldehyde condensates may vary in their reactivity with various carboxyl-containing copolymers. Moreover, when the reactants are combined it may be that reactions of certain combinations of reacting materials take place at a more rapid rate than others. But in any event the reaction products, when made of proper proportions of reacants, form valuable reaction products.

When the aldehyde condensate and carboxyl-containing copolymers are combined they are usually heated to bring about a reaction between these reactants, normally in the absence of a catalyst. By combining the urea or melamine product and the carboxyl-containing copolymer, and subsequently heating the blend at a temperature of 100° C. to 150° C. high gloss protective coatings are obtained. Proportions of the reactants vary with the particular product desired or its properties, and in some instances with the carboxyl-containing vinyl copolymer. For example, if a large amount of an acrylic ester is employed as the vinyl monomer in the preparation of the carboxyl-containing copolymer, the copolymer is less compatible with the urea aldehyde condensate. Accordingly, statements cannot be made concerning the quantities of aldehyde condensate and copolymer which will fit all cases. However, in general the carboxyl-containing copolymer is reacted with from about 5 to 60 percent by weight of aldehyde condensate, preferably with from 40 to 55 percent. The carboxyl-containing vinyl copolymer generally comprises from 5 to 25, and preferably from 8 to 15 percent by weight alpha-beta unsaturated carboxylic acid the remainder being vinyl monomer.

The invention will now be illustrated in greater detail by means of the following specific examples in which the preparation of typical carboxyl-containing copolymers and copolymer-aldehyde condensates is described. It should be understood that the invention is not to be limited to these particular examples or to the particular proportions reactants employed since the examples are illustrative only and are not intended to limit the invention.

Examples 1 and 2 describe the production of the unsaturated monocarboxylic acid-vinyl copolymer. Urea and melamine aldehyde condensates are well known and commercally available in various forms. The remaining examples, 3 through 6, describe several reaction products of this invention.

EXAMPLE 1

| Material: | Weight (grams) |
|---|---|
| Vinyl toluene | 216.0 |
| Methyl methacrylate | 60.0 |
| Acrylic acid | 24.0 |
| Benzoyl peroxide | 7.5 |
| Xylene | 300.0 |

Xylene (275 grams) is weighed into a one liter, three neck, round bottom reaction flask with stirrer and reflux condenser attached. The xylene is heated to 135° C. Benzoyl peroxide (6.0 grams) is dissolved in 216 grams vinyl toluene, 60 grams methyl methacrylate, 24 grams acrylic acid. This monomer-catalyst solution is then added dropwise through a dropping funnel to the hot xylene over a period of 50 minutes, maintaining maximum reflux all the while. After the monomer-catalyst addition is completed, the flask contents are held 40 minutes at heavy reflux. At this point an additional 1.5 grams benzoyl peroxide are dissolved in 25 grams xylene and this solution is added dropwise to the flask contents. After one hour refluxing, the temperature of flask contents is 139° C. The product is then cooled and poured into a suitable container. The following constants are obtained: percent solids—49.2 (2 hours at 150° C.); acid value of solids—63.2; and viscosity (25° C.)—$Z_5$–$Z_6$ (Gardner-Holdt).

The above procedure is representative of a method by which many carboxyl-containing vinyl copolymers can be prepared.

EXAMPLE 2

The copolymer solution of Example 1 (20.3 grams), 16.7 grams of a commercial butylated urea formaldehyde resin and 12.7 grams of xylene are blended together to give a 40 percent solids solution. A typical commercial butylated urea formaldehyde resin is one having the following properties: viscosity—S–V; solids—60 percent in 87½ percent butyl alcohol, 12½ percent xylene, and naphtha tolerance of 350. The resulting blend is cast in the form of a film which is baked 30 minutes at 150° C., yielding a cured film possessing outstanding hardness, mar resistance, acetone resistance, and gloss properties.

EXAMPLE 3

In this example 16.3 grams of a 49 percent solids solution of a copolymer consisting of a 95:5 ratio of styrene to acrylic acid, and which is prepared as described in Example 1, is blended with 20.0 grams of the butylated urea formaldehyde resin described in Example 3. Xylene (13.7 grams) is added to this blend to give a 40 percent solids solution. The resulting blended resin solution is cast in the form of a film, which is cured by baking 30 minutes at 150° C., the cured film having very good hardness, mar resistance, acetone resistance, and gloss properties.

EXAMPLE 4

A 50 percent solids solution of a copolymer consisting of 85 percent styrene, 15 percent methacrylic acid is prepared as described in Example 1 except that the solvent line-up is 50/50 xylene/methyl isobutyl ketone. An amount of 20.0 grams of this copolymer solution is blended with 16.7 grams of the butylated urea formaldehyde resin described in Example 2. Methyl isobutyl ketone (13.3 grams) is stirred into the blend to give a 40 percent solids solution. The resulting blend is cast in the form of a film which is baked 30 minutes at 150° C. yielding a cured film with excellent gloss and exceptionally good hardness, mar resistance and acetone resistance properties.

EXAMPLE 5

A 49 percent solids solution of the copolymer of Example 2 in an amount of 20.4 grams is blended with 16.7 grams of a commercial butylated melamine formaldehyde resin. A typical commercial butylated melamine formaldehyde resin is one having the following properties: solids—50 percent in 60/40 butanol/xylene; viscosity—L–O; and naphtha tolerance of 200. The resulting blend is cast in the form of a film which is baked 30 minutes at 150° C., giving a cured film possessing outstanding gloss, hardness, acetone resistance, and mar resistance properties.

EXAMPLE 6

A 50 percent solids solution (16.0 grams) of a copolymer consisting of 62 percent vinyl toluene, 30 percent butyl acrylate, 8 percent acrylic acid and which is made according to Example 1 is blended with 20.0 grams of the butylated urea formaldehyde resin described in Example 2. Xylene (14.0 grams) is added to the blend to give a 40 percent solids solution. The resulting blend is cast in the form of a film which is baked 30 minutes at 150° C., giving a cured film having excellent gloss, hardness, mar resistance, and acetone resistance properties.

It is seen that the present invention provides resins or resinous compositions and products in which aldehyde condensates are admixed with copolymers resulting from the reaction of various alpha-beta unsaturated acids with vinyl compounds to form initial compositions capable of conversion into final condensation products. Any of the known aldehyde urea or melamine condensates can be used and film-formers are produced which in addition to having outstanding physical properties such as toughness, resistance to marring, etc., possess outstanding chemical properties such as resistance to acetone and other solvents, acids, alkalies, etc.

The present invention provides a wide range of reaction compositions and products. The compositions of this invention can be used without or with fillers, plasticizers, extenders, and the like, of the inert type. For example, valuable enamels are obtained by pigmenting the compositions with the usual type of inert pigments used in the formulation of enamels and paints. It is also sometimes desirable to use such inert materials as wood flour or asbestos with the new compositions in the preparation of certain objects. However, the compositions are best used as coating compositions or film-formers because of their outstanding toughness and mar resistance.

In connection with the addition of plasticizers, in some instances, for example, when long chain alcohols are used in the preparation of the acrylic or other vinyl ester the reaction products may have suitable flexibility for protective coating films without the use of any plasticizer. In other instances, however, it is desirable to employ a plasticizer. Plasticizers which may be employed are dibutyl phthalate, epoxidized oils, dibutyl fumarate, dioctyl sebacate and di-(2-ethyl hexyl)phthalate, and castor oil.

The new compositions of this invention are also capable of admixture with various other resins in forming the final compositions and can also be used for compounding with fillers in making articles or in impregnating paper, fabric, wood, etc., and making impregnated or coated or laminated articles. Other uses, embodiments, and modifications will obviously occur to those skilled in the art, and hence are considered within the scope of this invention.

What is claimed is:

A process for the preparation of high gloss protective coatings which comprises coating a substrate with a film forming solution of (1) a carboxy copolymer of (a) a [vinylidene] *vinyl aromatic* compound selected from the group consisting of styrene and [alkyl-substituted styrene and alkyl esters of acrylic and methacrylic acids, each alkyl group having not more than twelve carbon atoms,] *methyl-substituted styrene* and (b) a monocarboxylic acid selected from the group consisting of acrylic acid and methacrylic acid, the acid constituting 5 to 25 percent of the copolymer and (2) an aldehydeammonia derivative selected from the group consisting of fusible, aldehyde-urea, aldehyde-melamine, alkylated aldehyde-urea and alkylated aldehyde-melamine condensates, and heating the film at a temperature sufficient to cure the film, wherein the solvent is a member of the group consisting of saturated aromatic hydrocarbon, ester and ketone solvents and wherein the carboxy copolymer constitutes 40 to 95 percent of (1) and (2).

References Cited by the Examiner

The following references cited by the Examiner, are of record in the patented file of this patent or the original patent.

UNITED STATES PATENTS

| | | | |
|---|---|---|---|
| 2,173,005 | 12/1939 | Strain | 260—851 X |
| 2,411,590 | 11/1946 | Powell. | |
| 2,537,019 | 1/1951 | Garrett. | |
| 2,553,524 | 5/1951 | Baer. | |
| 2,787,603 | 4/1957 | Sanders. | |
| 2,965,594 | 12/1960 | Maeder | 260—855 X |
| 3,018,265 | 1/1962 | Tessmar | 260—855 |

WILLIAM D. MARTIN, *Primary Examiner.*

H. E. COLE, W. D. HERRICK, *Assistant Examiners.*